US012588722B2

(12) United States Patent
Graham

(10) Patent No.: US 12,588,722 B2
(45) Date of Patent: Mar. 31, 2026

(54) HEADGEAR COMPRISING HEADBANDS FOR RECEIVING REMOVABLE LIGHT APPARATUS AND METHODS OF MAKING

(71) Applicant: Raquel Graham, Chicago, IL (US)

(72) Inventor: Raquel Graham, Chicago, IL (US)

( * ) Notice: Subject to any disclaimer, the term of this patent is extended or adjusted under 35 U.S.C. 154(b) by 0 days.

(21) Appl. No.: 18/395,701

(22) Filed: Dec. 25, 2023

(65) Prior Publication Data

US 2024/0122281 A1 Apr. 18, 2024

Related U.S. Application Data

(63) Continuation of application No. 17/234,473, filed on Apr. 19, 2021, now Pat. No. 11,849,788, which is a continuation of application No. 16/532,452, filed on Aug. 5, 2019, now abandoned.

(60) Provisional application No. 62/714,082, filed on Aug. 3, 2018.

(51) Int. Cl.

| | |
|---|---|
| ***A41D 27/20*** | (2006.01) |
| ***A41D 20/00*** | (2006.01) |
| ***A41D 27/24*** | (2006.01) |
| ***A41D 31/18*** | (2019.01) |
| ***F21V 21/084*** | (2006.01) |
| *F21Y 115/10* | (2016.01) |

(52) U.S. Cl.

CPC ........... *A41D 27/205* (2013.01); *A41D 20/00* (2013.01); *A41D 27/24* (2013.01); *A41D 31/18* (2019.02); *F21V 21/084* (2013.01); *A41D 2300/20* (2013.01); *F21Y 2115/10* (2016.08)

(58) Field of Classification Search

CPC .......... A42B 1/00; A42B 1/244; A41D 20/00; A41D 27/205; A41D 27/24

See application file for complete search history.

(56) References Cited

U.S. PATENT DOCUMENTS

| | | | | | |
|---|---|---|---|---|---|
| 2,640,980 | A * | 6/1953 | Prupis | A42B 1/242 | 362/186 |
| 4,797,793 | A * | 1/1989 | Fields | A41D 20/00 | 362/105 |
| 5,329,592 | A * | 7/1994 | Altman | H04R 5/0335 | 381/74 |
| 5,845,987 | A * | 12/1998 | Painter | A42B 1/244 | 362/206 |

(Continued)

*Primary Examiner* — Tajash D Patel

(74) *Attorney, Agent, or Firm* — TILLMAN WRIGHT, PLLC; Chad D. Tillman

(57) ABSTRACT

Various different embodiments of headbands are disclosed, each having a light apparatus and, in particular, a removable light apparatus that is rechargeable through a USB connection. The embodiments each has a grommet that accommodates the passing of a portion of the light apparatus therethrough for frictional fit therewith such that the light apparatus is retained in place by the frictional fit with the grommet and light is projected by the light apparatus outwardly from the grommet when the light apparatus is turned on. The embodiments of the headband differ in the structure of the body and the relationship of the grommet to the body. A preferred embodiment is formed from a cotton elastane blend and includes a pocket from within which the light apparatus is partially received by the grommet. The pocket is formed by overlapping end portions of two interior fabric panels forming the interior surface of the headband.

3 Claims, 7 Drawing Sheets

(56) References Cited

U.S. PATENT DOCUMENTS

| | | | | |
|---|---|---|---|---|
| 7,611,255 | B1 * | 11/2009 | Lagassey | F21V 21/0885<br>362/396 |
| 11,543,107 | B1 * | 1/2023 | Guo | F21V 21/0816 |
| 11,849,788 | B2 * | 12/2023 | Graham | A41D 27/24 |
| 12,075,873 | B2 * | 9/2024 | Hau | A42B 1/244 |
| 2006/0198122 | A1 * | 9/2006 | Senter | A42B 1/244<br>362/105 |
| 2007/0194066 | A1 * | 8/2007 | Ishihara | G04B 37/1486<br>224/164 |
| 2013/0198935 | A1 * | 8/2013 | Waters | H05K 5/03<br>361/728 |
| 2014/0082827 | A1 * | 3/2014 | Davidson | A61F 5/0003<br>2/173 |
| 2016/0088890 | A1 * | 3/2016 | Armagh | A42B 1/242<br>362/105 |
| 2016/0135743 | A1 * | 5/2016 | Cobbett | G08B 6/00<br>2/243.1 |
| 2016/0153652 | A1 * | 6/2016 | Peterson | F21V 33/0008<br>362/105 |
| 2018/0008150 | A1 * | 1/2018 | Hsieh | A41D 1/002 |
| 2019/0072268 | A1 * | 3/2019 | Tomita | A41F 9/002 |
| 2021/0285633 | A1 * | 9/2021 | Esmailzadeh | A42B 1/242 |
| 2022/0061444 | A1 * | 3/2022 | Gibson | F21V 21/084 |
| 2022/0339064 | A1 * | 10/2022 | Akbar | A41D 20/00 |
| 2023/0200478 | A1 * | 6/2023 | Waters | F21L 4/08<br>362/106 |

* cited by examiner

HEADGEAR COMPRISING HEADBANDS FOR RECEIVING REMOVABLE LIGHT APPARATUS AND METHODS OF MAKING

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to headgear having light apparatus and, in particular, headbands having grommets for receiving and retaining removable light apparatus that preferably are rechargeable through USB connections.

A beanie having a removable light apparatus that is rechargeable through a USB connection is known and is disclosed and described below with reference to FIGS. 1-14, of the publication of the present application, namely, patent application publication US 2024/012228 A1, which is incorporated herein by reference. The figures of this U.S. patent application publication are referred to hereinafter as "U.S. Publ. FIGS." U.S. Publ. FIGS. 1-14 constitute prior art to the invention.

Specifically, the beanie is seen in the photographs of U.S. Publ. FIGS. 1, 3, 4, 6, and 7. The fabric material of the beanie is made from acrylic fibers and is washable. In particular, the beanie is knit and is formed by sewing a two-ply fabric material, comprising an inner fabric layer and an outer layer of fabric. The inner and outer fabric layers are integrally joined at one end at a fold that defines an edge or rim of the fabric material, as illustrated in U.S. Publ. FIG. 1. Another end of the fabric material is sewn closed to form a crown of the beanie, also as seen in U.S. Publ. FIG. 1. A brim portion of the beanie—also seen in U.S. Publ. FIG. 1—is folded upwardly to transition the beanie into a use configuration, which configuration is seen in U.S. Publ. FIG. 7.

The beanie includes a grommet located within the brim portion. A close-up of a first side of the grommet is seen in U.S. Publ. FIG. 2, and a close-up of a second, opposite side of the grommet is seen in U.S. Publ. FIG. 4. The grommet is attached by cutting an opening in the two-play fabric material. The opening is cut in both the outer fabric layer and the inner fabric layer. The grommet is inserted into the opening, with the cut edges of the two-play fabric being received within a side channel that extends around the grommet. Stitching is performed around the periphery of the opposite sides of the grommet in order to sew the grommet to the two-ply fabric, with the cut fabric edges of the inner and outer fabric layers being retained within the channel. As such, the grommet actually extends on the oppositely facing interior and exterior surfaces of the brim of the beanie.

The light apparatus is seen by itself in the photographs of U.S. Publ. FIGS. 11-14. The light apparatus comprises a housing containing four LEDs configured to provide three levels of lighting; a (re)chargeable battery; a USB plug for electrically connecting to a USB port having a power source for charging the battery; and a switch for turning on and off the LEDs. A cap for the USB plug also is included in the light apparatus.

The housing is shaped and dimensioned to frictionally fit within and be retained by the grommet. U.S. Publ. FIG. 6 is a photograph illustrating the beanie with the housing of the light apparatus received within the grommet and frictionally retained therein; and U.S. Publ. FIG. 7 is a photograph illustrating the same beanie with light apparatus after the brim is folded upwardly into a use configuration for donning and wearing of the beanie on one's head.

As seen in U.S. Publ. FIG. 8, which is a closeup of the light apparatus and grommet of U.S. Publ. FIG. 7, the light apparatus is frictionally retained in place by engagement with an inner peripheral surface of the grommet. The housing fits flush and is tight with the inner peripheral surface of the grommet for retention of the light apparatus. A degree of force is required to withdraw the light apparatus such that the light apparatus will not dislodge from the grommet by mere handling of the beanie during normal use. Of course, the degree of force required to withdraw the beanie is less than a force required to actually damage the light apparatus. The grommet is formed from a rubber material and has a degree of resiliency for tightly receiving the housing within the opening of the grommet.

With regard to each drawing specifically: U.S. Publ. FIG. 1 is a photograph of a front of the beanie unfolded and laid flat on a table, wherein a first side of a grommet is seen; U.S. Publ. FIG. 2 is a close-up of the grommet seen in U.S. Publ. FIG. 1; U.S. Publ. FIG. 3 is a photograph of a back of the beanie of FIG. 1 unfolded and laid flat on a table; U.S. Publ. FIG. 4 is a photograph of the back of the beanie seen in U.S. Publ. FIG. 3, wherein the lower back portion has been lifted to show a second, opposite side of the grommet; U.S. Publ. FIG. 5 is a close-up of the grommet seen in U.S. Publ. FIG. 4; U.S. Publ. FIG. 6 is a photograph of the front of the beanie as seen in U.S. Publ. FIG. 1, wherein the light apparatus has been received within and is being frictionally retained in place by engagement of the housing of the light apparatus with the inner peripheral surface of the grommet; U.S. Publ. FIG. 7 is a photograph of the front of the beanie seen in U.S. Publ. FIG. 6, wherein a lower portion of the beanie (i.e., the brim) has been folded upwardly whereby the beanie is transitioned to a use configuration and is ready for donning on a person's head; U.S. Publ. FIG. 8 is a close-up of the light apparatus seen in U.S. Publ. FIG. 7 better showing the light apparatus being frictionally retained in place by engagement with the inner peripheral surface of the grommet; U.S. Publ. FIG. 11 is a photograph of a top of the light apparatus of U.S. Publ. FIGS. 6-8; U.S. Publ. FIG. 12 is a photograph of a bottom of the light apparatus of U.S. Publ. FIG. 11; U.S. Publ. FIG. 13 is a photograph of the top of the light apparatus of U.S. Publ. FIG. 11, wherein the cap has been pulled off of the USB plug of the light apparatus; and U.S. Publ. FIG. 14 is a photograph of the bottom of the light apparatus as seen in U.S. Publ. FIG. 13.

Additionally, FIG. 1 hereof is a schematic illustration of the beanie taken along the line 9-9 of U.S. Publ. FIG. 1; and FIG. 2 hereof is a schematic illustration of the beanie taken along the line 10-10 of FIG. 7, wherein the light apparatus is omitted for clarity. The schematic illustrations serve to highlight the layers of the fabric material of the beanie, both in the unfolded configuration (FIG. 1), and the folded, use configuration (FIG. 2).

It will be appreciated that the beanie is worn during cold weather for keeping one's head warm, and the light apparatus provides light in a direction of site while keeping one's hands free. The conventional beanie and light apparatus, however, is not as useful in all activities, including those performed when the weather is not so cool as to warrant use of a beanie per se for warmth. In such situations, it would be advantages to have the top of one's head uncovered for allowing body heat to escape. During exercise it would be further advantageous to have a headband that does not retain heat but, rather, is designed to promote cooling, all while continuing to provide light in a direction of site while keeping one's hands free.

Accordingly, it is believed that a need exists for improvement in headgear having light apparatus and, in particular, it is believed that a need exists for a headband having a removable and rechargeable light apparatus. This, and other needs, are addressed by one or more aspects and features of the invention.

SUMMARY OF THE INVENTION

The invention includes many aspects and features.

In a first aspect, headgear preferably comprising a headband comprises: a body comprising a two-ply fabric tube having an inwardly facing interior surface and an outwardly facing exterior surface; a grommet attached to the body and defining an opening into a space defined by the body between the two surfaces; and a slit located in the body defining another opening into the space defined by the body between the two surfaces. The slit accommodates the passing of a light apparatus therethrough completely into the space defined by the body between the two surfaces. The grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on. Preferably, a housing of the light apparatus is received within the opening of the grommet for frictional fit therewith such that the light apparatus is retained in place by the frictional fit with the grommet during normal use of the headband.

In a feature, the body of the headband comprises acrylic fibers.

In another feature, the material of the body of the headband is acrylic.

In another feature, the material of the body comprises only acrylic fibers.

In another aspect, headgear preferably comprising a headband comprises: a body a two-ply fabric material having an interior fabric panel defining an inwardly facing interior surface and an outer fabric panel defining an outwardly facing exterior surface, with opposite ends of the body being secured together such that the body surrounds a head-receiving area and is configured for donning on a person's head as a headband. A grommet is attached to the body and defines an opening extending through the said surfaces of the body, and a cover panel is attached to the body and extends adjacent one of said surfaces in covering relation to the grommet. The cover panel includes at least one open end that accommodates the passing of a light apparatus to the grommet such that the light apparatus is covered by the cover panel when received within the opening of the grommet. Specifically, the grommet accommodates the passing of a portion of the light apparatus therethrough for frictional fit therewith such that the light apparatus is retained in place by such frictional fit, and light is projected by the light apparatus outwardly from the grommet when the light apparatus is so received and turned on.

In a feature, the body comprises a fleece material.

In another feature, the body of the headband is adjustable for fitting different head sizes. Adjustability preferably results from an elasticity of the material of the headband. Alternatively, the body of the headband includes a mechanism for adjusting the size of the headband, such as, for example, hook-and-loop fasteners or other mechanisms for adjustment conventionally found in headgear.

In another aspect, headgear preferably comprising a headband comprises: a body comprising a two-ply fabric material having two oppositely facing surfaces, with a first of two opposite ends of the body being secured adjacent a first of the surfaces at a first juncture with the body located intermediate the two opposite ends, and with a second of the two opposite ends of the body being secured adjacent a second of the oppositely facing surfaces at a second juncture of the body located intermediate the two opposite ends, whereby the body surrounds a head-receiving area and is configured for donning on a person's head as a headband. A grommet is attached to the body and defines an opening extending through the said oppositely facing surfaces of the body. The second juncture is located on a first interior lateral side of the grommet and an intermediate portion of the body is secured to the second of the oppositely facing surfaces on a second interior lateral side of the grommet such that a pocket having at least one open end is defined, the opening in the grommet leading into the pocket. The at least one open end of the pocket accommodates the passing of a light apparatus to the grommet such that the light apparatus is received within the pocket. The grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on.

In a feature, the body comprises a cotton elastane blend.

In another feature, the material of the body of the headband is elastic and preferably comprises a fabric formed from cotton, polyester, and spandex. An exemplary fabric comprises 70% cotton, 10% polyester, and 20% spandex (by weight). The fabric also preferably is moisture wicking, soft, and easy to clean. An antimicrobial treatment also may be applied to the fabric of the headband.

In another aspect, headgear preferably comprising a headband comprises: a body comprising a two-ply fabric material formed by a single exterior panel and first and second interior panels, the body having an inwardly facing interior surface and an outwardly facing exterior surface, with opposite ends of the body being secured together such that the body surrounds a head-receiving area and is configured for donning on a person's head as a headband, wherein the single exterior fabric panel forms the outwardly facing exterior surface and the first and second interior panels form the inwardly facing interior surface of the body, the first and second interior panels having first ends secured together and having second ends overlapping one another so as to define a pocket; and a grommet attached to the body and defining an opening extending through the single exterior panel forming the outwardly facing exterior surface and one of the first and second interior panels, the grommet defining an opening leading into the pocket defined by the overlapping second ends of the first and second interior panels. The pocket has an open end accommodating the passing of a light apparatus to the grommet such that the light apparatus is received within the pocket and covered by one of the second ends of the interior panels. The grommet accommodates the passing of a portion of the light apparatus therethrough for frictional fit therewith such that the light apparatus is retained in place by the frictional fit with the grommet and light is projected by the light apparatus outwardly from the grommet when the light apparatus is turned on.

In a feature, each of the two interior panels comprises a mesh material.

In a feature, the material of the body of the headband comprises a cotton elastane blend.

In a feature, the headgear also comprises the light apparatus, all of which is sold together as a consumer product. In alternatives, the headband and the light apparatus are sold separately.

In another aspect, a method of making headgear preferably comprising a headband comprises the steps of: forming a body comprising a two-ply fabric tube having an inwardly facing interior surface and an outwardly facing exterior surface; attaching a grommet to the body such that an opening of the grommet leads into a space defined by the body between the two surfaces; forming a slit in the body such that an opening of the slit leads into the space defined by the body between the two surfaces; passing a light apparatus completely through the opening of the slit into the space defined by the body between the two surfaces; and passing of a portion of the light apparatus through the opening in the grommet such that the light apparatus is retained in place by a frictional fit with the grommet and light is projected by the light apparatus outwardly from the grommet when the light apparatus is turned on.

In a feature, the body of the headband is formed from acrylic fibers.

In another feature, the material of the body is formed only from acrylic fibers.

In another aspect, a method of making headgear preferably comprising a headband comprises the steps of: forming a body comprising a two-ply fabric material having an interior fabric panel defining an inwardly facing interior surface and an outer fabric panel defining an outwardly facing exterior surface, with opposite ends of the body being secured together such that the body surrounds a head-receiving area and is configured for donning on a person's head as a headband; attaching a grommet to the body such that an opening of the grommet extends through the said surfaces of the body; attaching a cover panel to the body adjacent one of said surfaces and in covering relation to the grommet; passing a light apparatus completely through an open end of the cover panel to the grommet such that the light apparatus is covered by the cover panel; and passing of a portion of the light apparatus through the opening in the grommet such that the light apparatus is retained in place by a frictional fit with the grommet and light is projected by the light apparatus outwardly from the grommet when the light apparatus is turned on.

In another aspect, a method of making headgear preferably comprising a headband comprises the steps of: forming a body comprising a two-ply fabric material having two oppositely facing surfaces, with a first of two opposite ends of the body being secured adjacent a first of the surfaces at a first juncture with the body located intermediate the two opposite ends, and with a second of the two opposite ends of the body being secured adjacent a second of the oppositely facing surfaces at a second juncture of the body located intermediate the two opposite ends, whereby the body surrounds a head-receiving area and is configured for donning on a person's head as a headband; attaching a grommet to the body such that an opening of the grommet extends through the said oppositely surfaces of the body, wherein the second juncture is located on a first interior lateral side of the grommet; securing an intermediate portion of the body to the second of the oppositely facing surfaces on a second interior lateral side of the grommet such that a pocket having at least one open end is defined, the opening in the grommet leading into the pocket; passing a light apparatus completely through the open end of the pocket to the grommet such that the light apparatus is received within the pocket; and passing of a portion of the light apparatus through the opening in the grommet such that the light apparatus is retained in place by a frictional fit with the grommet and light is projected by the light apparatus outwardly from the grommet when the light apparatus is turned on.

In another aspect, a method of making headgear preferably comprising a headband comprises the steps of: forming a body comprising a two-ply fabric material formed by a single exterior panel and first and second interior panels, the body having an inwardly facing interior surface and an outwardly facing exterior surface, with opposite ends of the body being secured together such that the body surrounds a head-receiving area and is configured for donning on a person's head as a headband, wherein the single exterior fabric panel forms the outwardly facing exterior surface and the first and second interior panels form the inwardly facing interior surface of the body, the first and second interior panels having first ends secured together and having second ends overlapping one another so as to define a pocket; attaching a grommet to the body such that an opening of the grommet extends through the single exterior panel forming the outwardly facing exterior surface and one of the first and second interior panels, the grommet defining an opening leading into the pocket defined by the overlapping second ends of the first and second interior panels; passing a light apparatus completely through the open end of the pocket to the grommet such that the light apparatus is received within the pocket and covered by one of the second ends of the two interior panels; and passing of a portion of the light apparatus through the opening in the grommet such that the light apparatus is retained in place by a frictional fit with the grommet and light is projected by the light apparatus outwardly from the grommet when the light apparatus is turned on.

In a feature, each of the two interior panels comprises a mesh material.

Another aspect comprises headgear preferably comprising a headband as disclosed and described herein.

Another aspect comprises a method of making headgear preferably comprising a headband as disclosed and described herein.

Another aspect comprises headgear preferably comprising a headband comprising or made by any of the foregoing aspects or features.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings.

FIG. 1.

FIG. 15.

FIG. 19.

FIG. 25.

FIG. 33.

FIG. 7 is a schematic illustration of the headband taken along the line 49-49 of U.S. Publ. FIG. 40.

DETAILED DESCRIPTION

Figure 1:
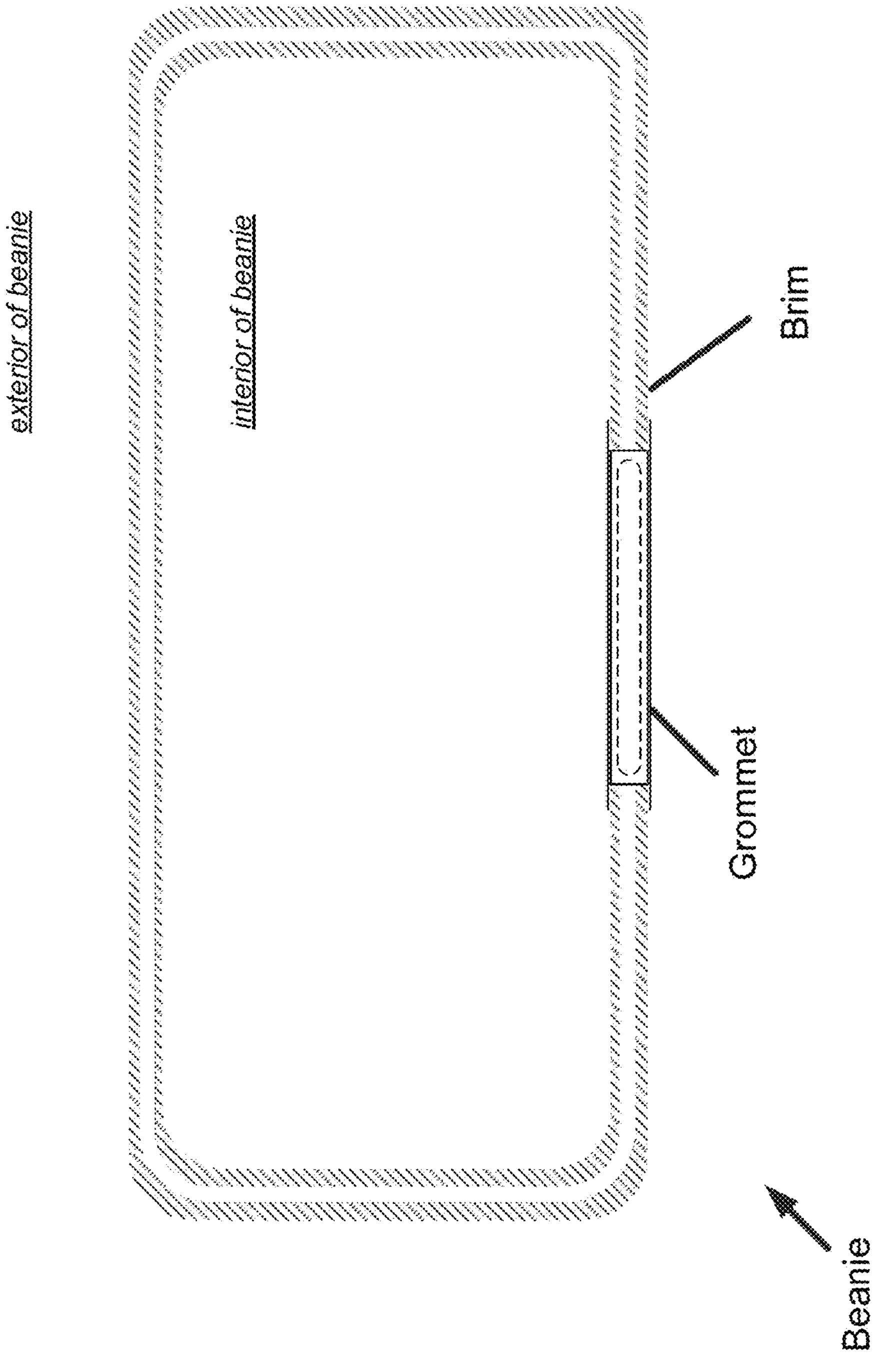
FIG. 1 (prior art)
FIG. 1 is a schematic illustration of the beanie taken along the line 9-9 of U.S. Publ.
Figure 2:
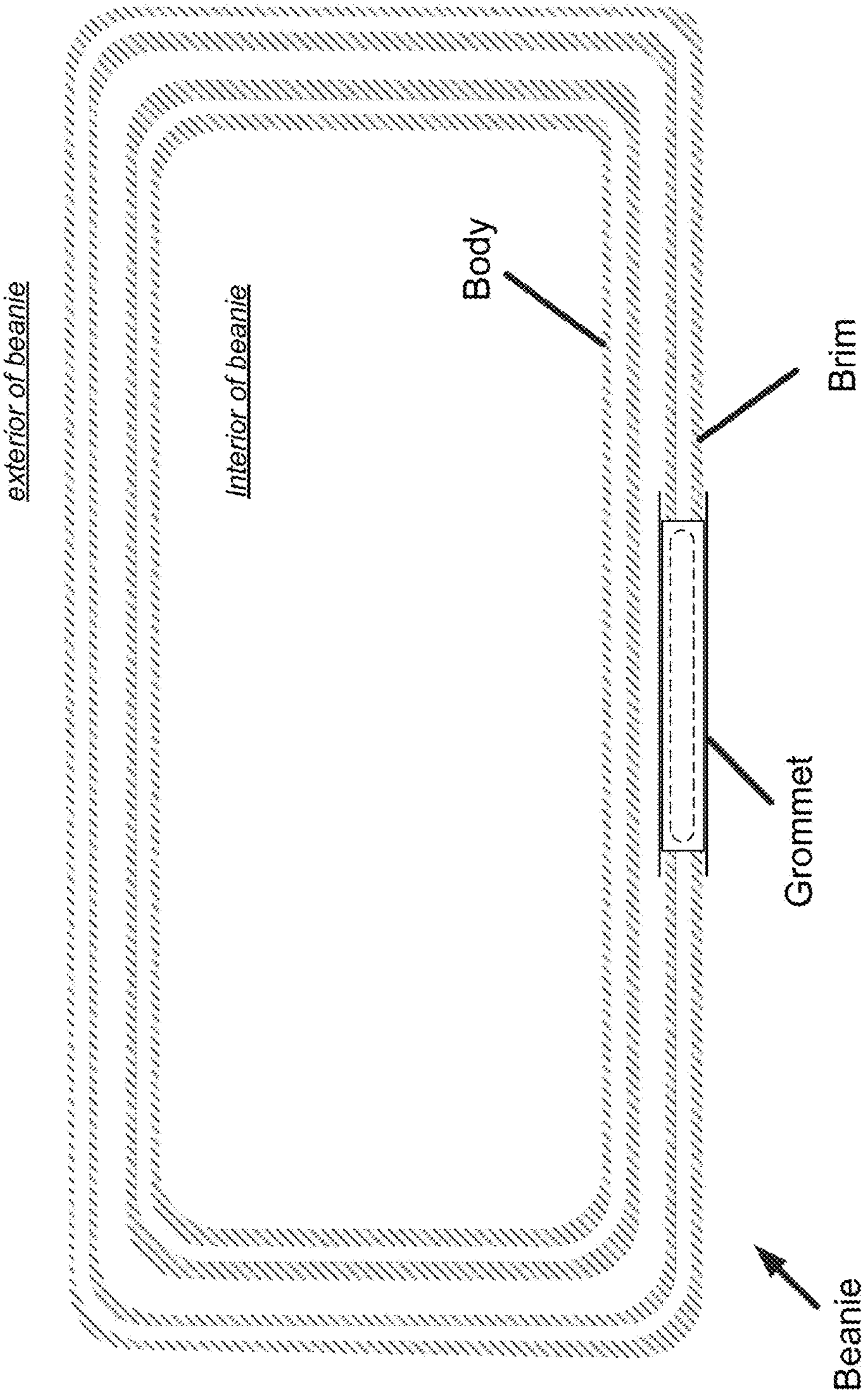
FIG. 2 (prior art)
FIG. 2 is a schematic illustration of the beanie taken along the line 10-10 of U.S. Publ.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

First Embodiment

Turning now to U.S. Publ. FIGS. 15-22 and 24, together with FIG. 3 hereof, a first embodiment of a headband of the invention is described. In this respect, U.S. Publ. FIG. 15 is a photograph of a front of a headband in accordance with a first embodiment of the invention, wherein the headband has been unfolded and laid flat on a table, and wherein a first side of a grommet is seen located in a lower portion of a front wall of the headband.

U.S. Publ. FIG. 16 is a photograph of a back of the headband of U.S. Publ. FIG. 15 unfolded and laid flat on a table.

U.S. Publ. FIG. 17 is a photograph of the back of the headband of U.S. Publ. FIG. 16, wherein a lower portion of a rear wall has been rolled up to reveal a slit on an interior surface of a lower half of the front wall of the headband. U.S. Publ. FIG. 18 is a photograph showing part of a second, opposite side of the grommet as seen through the slit of U.S. Publ. FIG. 17.

The headband of this embodiment generally comprises a single-ply fabric that has been folded in on itself and sewn together at its ends to form a two-ply fabric tube. The tube, in turn, forms a headband. The ends are sewn together approximately half-way between the top and bottom edges of the unfolded headband seen in U.S. Publ. FIGS. 15 and 16. A seam joins the ends, which can partially be seen in U.S. Publ. FIGS. 17 and 18. The seam results in a bulge, which is visible on the exterior of the headband as seen, for example, in U.S. Publ. FIGS. 15 and 16.

The grommet is inserted within an opening that is created in the outer fabric layer of the front wall of the headband. The outer fabric layer is received within a peripheral side channel of the grommet that extends completely around the grommet. The grommet is secured to the outer layer by sewing around the periphery on the opposite sides of the grommet. This is similar to how the grommet of the beanie of U.S. Publ. FIGS. 1-8 is attached; however, the grommet in the beanie is sewn to both the outer and inner fabric layers wherein in the headband of this first embodiment, the grommet is sewn only to the outer fabric layer and is not sewn to the inner fabric layer. A slit is formed in the inner layer, preferably in facing relation to the opening of the grommet.

U.S. Publ. FIG. 19 is a photograph of the front of the headband of U.S. Publ. FIG. 15, wherein an upper half of the headband has been folded downwardly and inwardly, thereby doubling the thickness of the headband while halving the height. The headband so folded thereby transitions to a use configuration as seen for example in U.S. Publ. FIG. 19. U.S. Publ. FIG. 20 is a photograph of the back of the headband in this use configuration.

U.S. Publ. FIG. 21 is a photograph of the front of the headband of U.S. Publ. FIG. 19, wherein a light apparatus is seen to have been received within and is being frictionally retained in place by engagement with an inner peripheral surface of the grommet. The light apparatus is inserted into the grommet from within the interior space of the inner and outer fabric layers by first passing the light apparatus through the slit. U.S. Publ. FIG. 22 is a photograph of a portion the headband of U.S. Publ. FIG. 21, wherein the slit is seen located on the interior surface of a lower half of the front wall of the headband just below the seam joining the ends of the fabric tube together, with the interior surface of an upper half of the front wall extending adjacent thereto.

Figure 3:
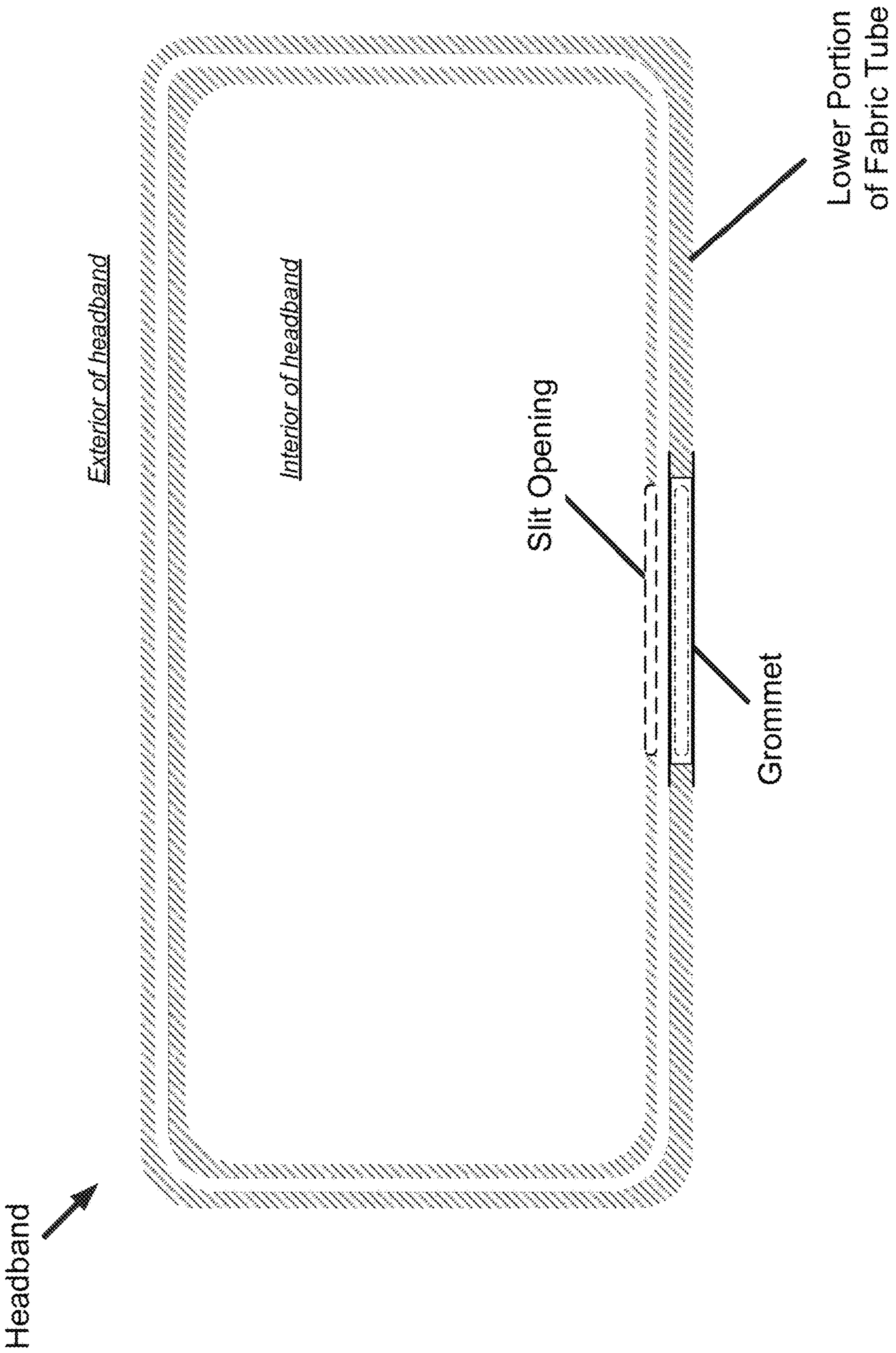
FIG. 3 is a schematic illustration of the headband taken along the line 23-23 of U.S. Publ.
Figure 4:
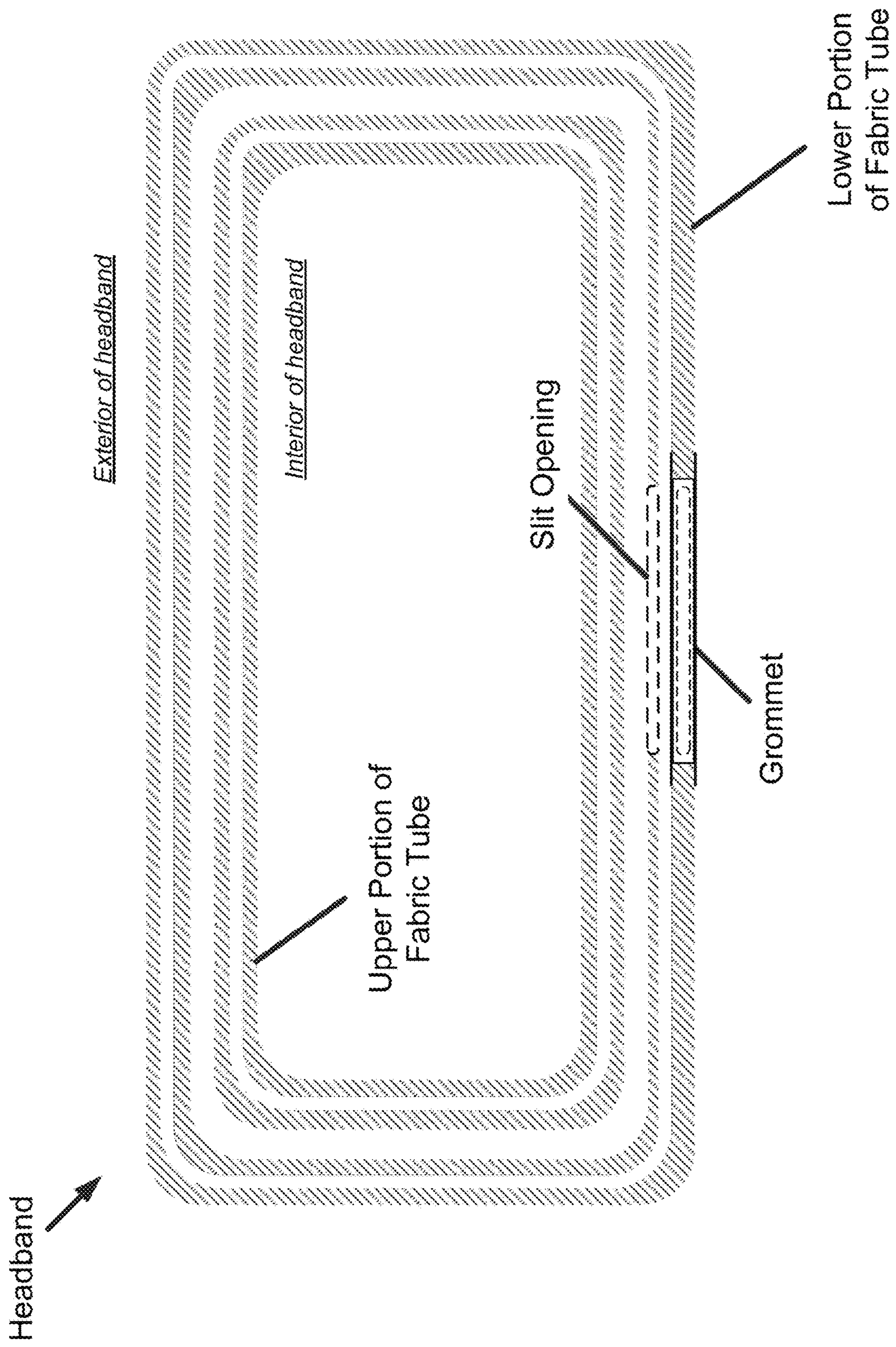
FIG. 4 is a schematic illustration of the headband taken along the line 24-24 of U.S. Publ.

Additionally, FIG. 3 hereof is a schematic illustration of the headband taken along the line 23-23 of U.S. Publ. FIG. 15; and FIG. 4 hereof is a schematic illustration of the headband taken along the line 24-24 of U.S. Publ. FIG. 19. These schematic figures serve to highlight the layers of the fabric material of the headband, both in the unfolded configuration (FIG. 3), and the folded, use configuration (FIG. 4).

It will be appreciated form the foregoing that the headband—when in the use configuration—is four-ply in total thickness, with three fabric layers extending between the light apparatus and one's head when the headband is properly donned. The four-ply headband is believed to provide warmth while still being cooler than the beanie due to the exposure of the top of the head. As such, the headband of this first embodiment is intended for use in temperatures that are slightly warmer than what would be comfortable for use with a two-ply beanie. It further is believed that the three fabric layers provide greater cushioning and, therefore, greater comfort to the wearer of the headband of this first embodiment compared to the beanie, which includes only two fabric layers of cushioning when the brim is folded upwardly and the beanie is donned.

Second Embodiment

Turning now to U.S. Publ. FIGS. 25-31 and FIG. 5 hereof, a second embodiment of a headband of the invention is described. In this respect, U.S. Publ. FIG. 25 is a photograph of a front of this headband, wherein the headband has been laid flat on a table, and wherein a first side of a grommet is seen located in a front wall of the headband. U.S. Publ. FIG. 26 is a photograph of a back of the headband of U.S. Publ. FIG. 25laid flat on the table.

U.S. Publ. FIG. 27 is a photograph of the headband like that of U.S. Publ. FIG. 26, but wherein a middle of the back portion of the headband has been raised to reveal an open-ended cover panel extending adjacent an interior surface of the front wall of the headband. U.S. Publ. FIG. 28 is a photograph like that of U.S. Publ. FIG. 27, wherein the headband is seen resting on a rim thereof, and wherein the cover panel again is seen on the interior surface of the front wall of the headband.

U.S. Publ. FIG. 29 is a photograph of the headband as seen in U.S. Publ. FIG. 27 with an end of the cover panel raised up to reveal an interior space that is covered by the cover panel. U.S. Publ. FIG. 30 is a photograph like that of U.S. Publ. FIG. 29, but wherein a second, opposite side of the grommet and the grommet opening are seen. This second, opposite side of the grommet is covered by the cover panel and therefore is not visible in U.S. Publ. FIGS. 27-29.

U.S. Publ. FIG. 31 is a photograph of the front of the headband of U.S. Publ. FIG. 25, wherein a light apparatus is seen to have been received within and is being frictionally retained in place by engagement with an inner peripheral surface of the grommet. The light apparatus is inserted into the opening of the grommet by passing the grommet through an open end of and behind the cover panel.

Figure 5:
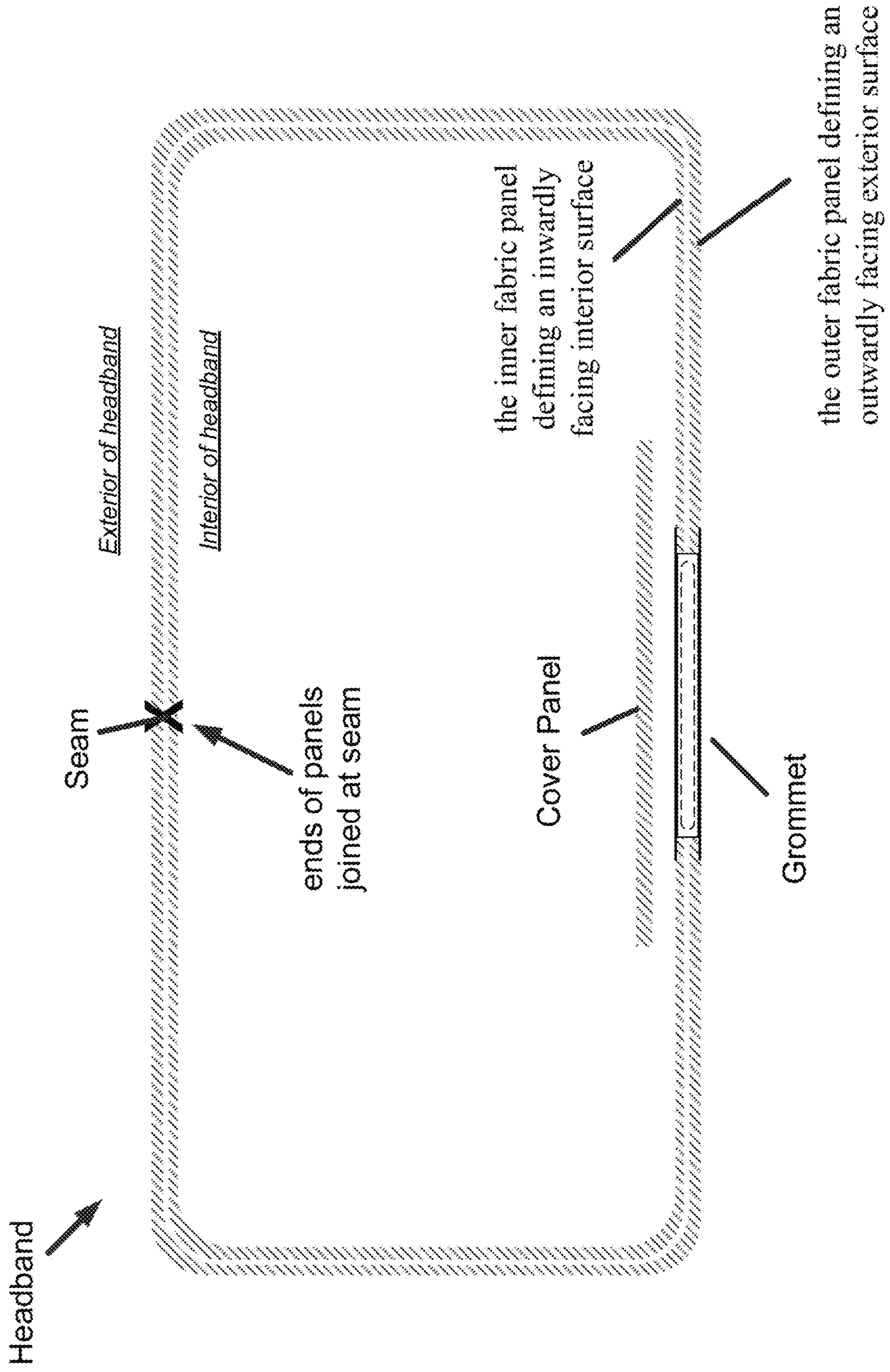
FIG. 5 is a schematic illustration of the headband taken along the line 32-32 of U.S. Publ.

FIG. 5 hereof is a schematic illustration of the headband taken along the line 32-32 of U.S. Publ. FIG. 25, which serves to highlight the fabric panels of the headband. In particular, it will be appreciated from the foregoing disclosure and reference to U.S. Publ. FIGS. 25-31 that the headband comprises an outer fabric panel and an inner fabric panel. The outer panel (which is black) is folded over and sewn along upper and lower lateral edges thereof to form top and bottom rims of the headband. The inner fabric panel, which comprises a leopard print as seen in the figures, is sewn along upper and lower lateral edges to the lateral edges of the outer fabric panel below the upper and lower rims on the interior of the headband. The opposite transverse ends of the outer and inner panels are joined together by being sewn to form a seam thereby forming the generally oval shape of the headband. This seam is perhaps best seen in U.S. Publ. FIG. 26.

Each of the outer fabric panel and the inner fabric panel is single-ply, whereby the headband is dual-ply. The grommet is secured to both the outer and inner fabric panels by stitching. The two-ply headband is believed to provide warmth while still being cooler than the beanie due to the exposure of the top of the head and, further, is believed to be cooler than the four-ply headband of the first embodiment. As such, the headband of this second embodiment is intended for use in temperatures that are slightly warmer than what would be comfortable for use with either a two-ply beanie or a four-ply headband.

To provide cushioning between the light apparatus and the head, the cover panel is provided. The cover panel seen in the drawings is single-ply; however, it is contemplated that a multi-ply cover panel may be used for greater cushioning, as desired. The cover panel is secured by sewing the upper and lower lateral edges of the cover panel to the upper and lower rims of the headband.

Third Embodiment

Turning now to U.S. Publ. FIGS. 33-38, a third embodiment of a headband of the invention is described. In this respect, U.S. Publ. FIG. 33 is a photograph of a front of a headband in accordance with a third embodiment of the invention, wherein the headband has been laid flat on a table, and wherein a first side of a grommet is seen located in a front wall of the headband. U.S. Publ. FIG. 34 is a photograph of a back of the headband of U.S. Publ. FIG. 33 laid flat on a table.

U.S. Publ. FIG. 35 is a photograph of the headband of U.S. Publ. FIG. 33 seen resting on a bottom rim thereof, wherein a top view of the headband is shown, and wherein a second, opposite side of the grommet is seen located within a transversely extending pocket that opens along a top rim of the headband. U.S. Publ. FIG. 36 is a photograph like that of U.S. Publ. FIG. 35.

U.S. Publ. FIG. 37 is a photograph like that of U.S. Publ. FIG. 35, but wherein the headband has been turned over so that it is seen resting on its top rim, whereby a bottom view of the headband is shown. U.S. Publ. FIG. 38 is a photograph of the front of the headband like that of U.S. Publ. FIG. 33, but wherein a light apparatus is seen to have been received within and is being frictionally retained in place by engagement with an inner peripheral surface of the grommet.

Figure 6:
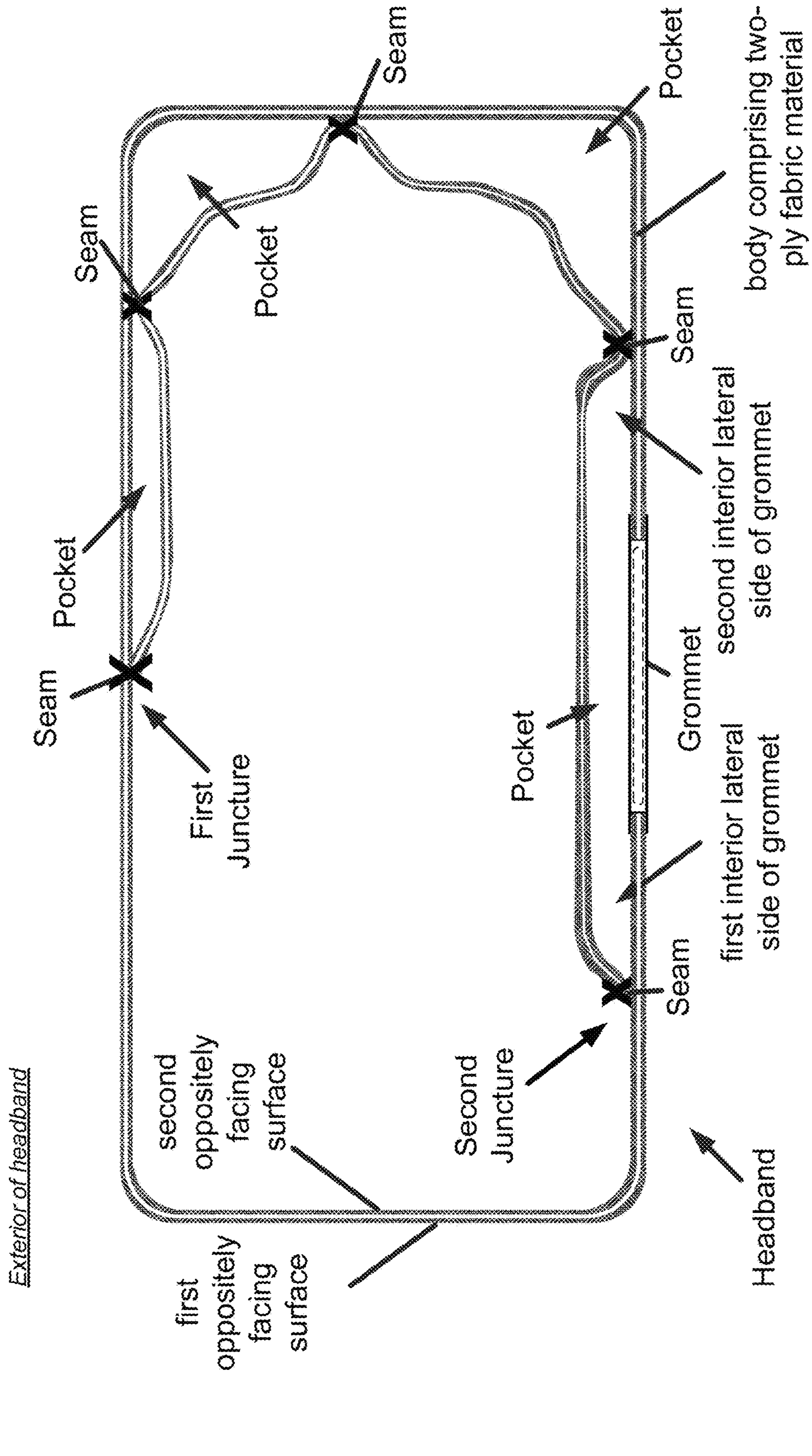
FIG. 6 is a schematic illustration of the headband taken along the line 39-39 of U.S. Publ.

FIG. 6 is a schematic illustration of the headband taken along the line 39-39 of U.S. Publ. FIG. 33, which serves to highlight the arrangement of the body of the headband. In particular, it will be appreciated from the foregoing disclosure and reference to U.S. Publ. FIGS. 33-38 that the headband of the third embodiment comprises a body having first and second oppositely facing surfaces. These surfaces are defined respectively by first and second fabric panels. The first panel is folded over and sewn along upper and lower lateral edges thereof to form top and bottom rims. The second fabric panel is sewn along upper and lower lateral edges to the lateral edges of the first fabric panel below the top and bottom rims. One of the opposite ends of the body is sewn to the first fabric panel intermediate the opposite ends, and the other of the opposite ends of the body is sewn to the second fabric panel on a first interior lateral side of the grommet. The body also is sewn at additional transverse areas (e.g., the three seams seen in FIG. 6 hereof) to the second fabric panel so as to form open-ended transversely extending pockets on the interior of the headband. These open-ended pockets are perhaps best seen in U.S. Publ. FIG. 35, with the grommet opening leading into the pocket formed in part by the seam of the second juncture.

Each of the first and second fabric panels is single-ply, whereby the headband is dual-ply where not overlapping itself. In areas of overlap, which areas define the open-ended pockets, the headband is four-ply. The grommet is secured to the outer and inner fabric panels of a front wall of the headband by stitching, with an overlapping portion extending over and covering the grommet on the interior side of the headband.

It will thus be appreciated that headband of the third embodiment comprises at least a portion that is four-ply (i.e., in the overlapping areas of the pockets). Furthermore, the overlapping areas comprise at least a little over half of the circumference of the headband, such that the grommet is covered on the interior. Moreover, the overlapping areas may extend to the full length of the headband if desired (not shown).

The illustrated headband of this third embodiment is believed to provide warmth while still being cooler than the beanie due to the exposure of the top of the head and, further, is believed to be cooler than the four-ply headband of the first embodiment. As such, the headband of this third embodiment is intended for use in temperatures that are slightly warmer than what would be comfortable for use with a two-ply beanie or the four-ply headband of the first embodiment. Moreover, due to the material used, the headband of the third embodiment is believed to be cooler than the two-ply headband of the second embodiment.

Fourth Embodiment

Turning now to U.S. Publ. FIGS. 40-48, a fourth embodiment of a headband of the invention is described, which also represents the preferred commercial embodiment. In this respect, U.S. Publ. FIG. 40 is a photograph of a front of a headband in accordance with a fourth embodiment of the invention, wherein the headband has been laid flat on a table, and wherein a first side of a grommet is seen located in a front wall of the headband. U.S. Publ. FIG. 41 is a photograph like that of U.S. Publ. FIG. 40, but wherein the headband has been turned inside out. Described in detail below, the headband includes overlapping portions of a mesh material that define a laterally extending pocket, a portion of which is visible through the opening in the grommet seen in U.S. Publ. FIG. 40.

Similarly, U.S. Publ. FIG. 42 is a photograph of a back of the headband of U.S. Publ. FIG. 40 laid flat on a table, and U.S. Publ. FIG. 43 is a photograph like that of U.S. Publ. FIG. 42, but wherein the headband has been turned inside out.

U.S. Publ. FIG. 44 is a photograph of the headband of U.S. Publ. FIG. 40 seen resting on a bottom rim thereof, wherein a top view of the headband is shown, and U.S. Publ. FIG. 45 is a photograph like that of U.S. Publ. FIG. 44.

U.S. Publ. FIG. 46 is a photograph like that of U.S. Publ. FIG. 42, but wherein a middle back portion has been raised and a mouth of an interior pocket is opened to partially reveal a second, opposite side of the grommet.

U.S. Publ. FIG. 47 is a photograph like that of U.S. Publ. FIG. 40, but wherein a light apparatus is seen to have been received within and is being frictionally retained in place by engagement with an inner peripheral surface of the grommet. U.S. Publ. FIG. 48 is a photograph like that of U.S. Publ. FIG. 47, but wherein a middle portion of the front of the headband has been turned over to reveal the pocket, and wherein the mouth of the pocket has been opened to reveal a back of the light apparatus.

Figure 7:
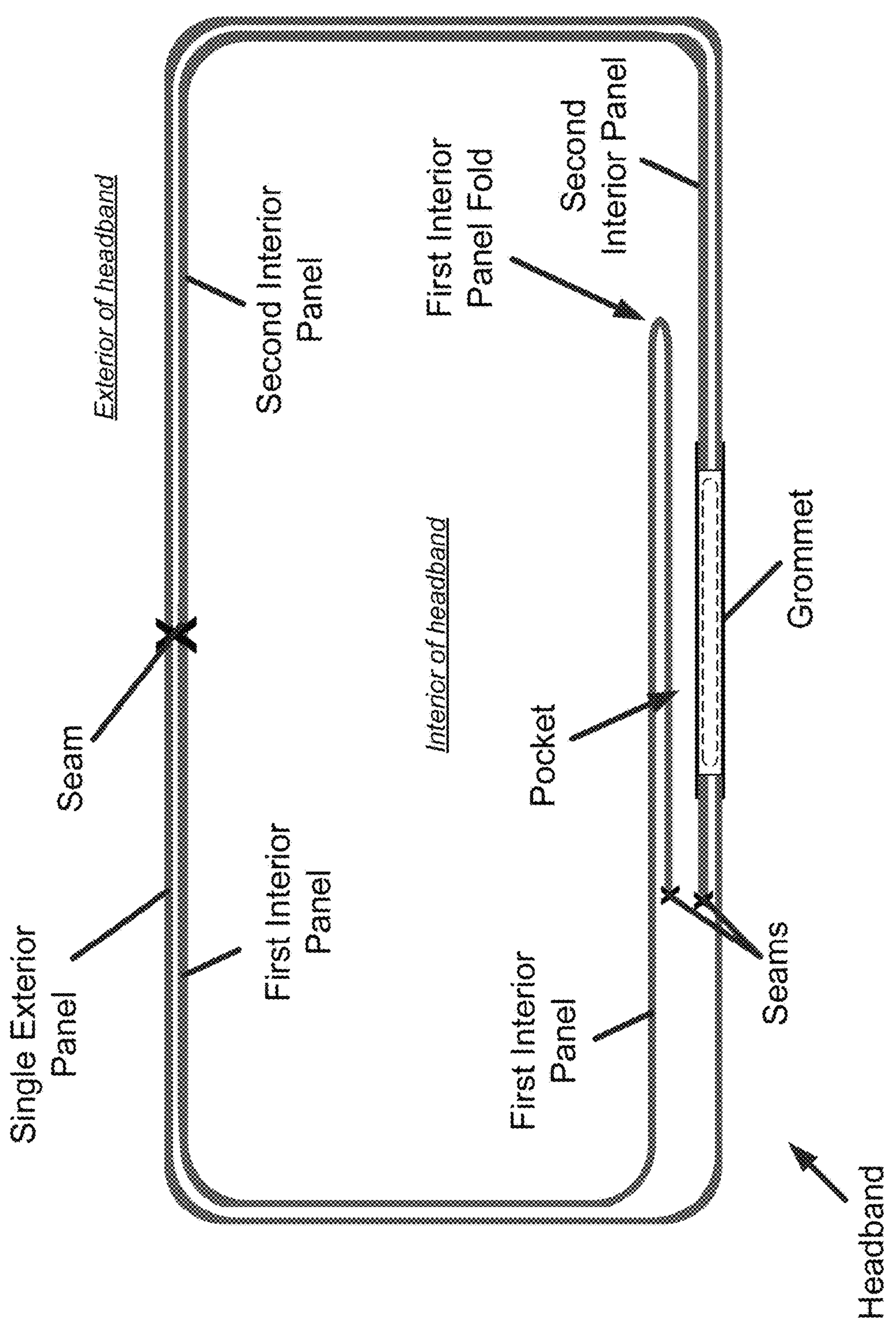
FIG. 7,wherein the light apparatus is omitted for clarity.

FIG. 7 hereof is a schematic illustration of the headband taken along the line 49-49 of U.S. Publ. FIG. 40, which serves to highlight the fabric panels of the headband. In particular, it will be appreciated form the foregoing disclosure and reference to U.S. Publ. FIGS. 40-48 that the headband of the fourth embodiment comprises an exterior fabric panel (which is black in U.S. Publ. FIGS. 40-48) and two interior fabric panels (each of which is seen as an orange mesh fabric in U.S. Publ. FIGS. 40-48). The exterior panel is folded over and sewn along upper and lower lateral edges thereof to form top and bottom rims. The opposite ends of the exterior fabric panel are sewn together at a transverse seam extending between the top and bottom rims. The interior fabric panels are sewn along their upper and lower lateral edges to the lateral edges of the outer fabric panel proximate the top and bottom rims. A respective end of each interior fabric panel also is sewn to the ends of the exterior fabric panel at the transverse seam. The other ends of the interior fabric panels overlap one another to create a laterally extending pocket, as seen in U.S. Publ. FIG. 46.

Accordingly, a portion of the headband comprising the exterior fabric panel and only one of the interior fabric panels where there is no overlap is two-ply. In contract, the portion of the headband that includes the overlapping interior fabric panels is three-ply (single-ply exterior fabric panel with two single-ply interior fabric panels), with the exception of a sub-portion proximate the grommet being four-ply (due to the folded-back end portion of the second interior fabric panel). A two-ply portion of the fabric material thereby covers the grommet and provides cushioning.

The two-ply/three-ply/four-ply headband is believed to be the coolest of the headbands and most suitable for use in warmer weather due to the exposure of the top of the head, the material used, and the panel structure thereof, including the mesh material of the interior fabric panels.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. Headgear comprising a headband, the headband comprising:

(a) a fabric body;

(b) a grommet sewn to the fabric body and defining an opening into a pocket, wherein the pocket is formed by overlapping end portions of two interior fabric panels that form an interior surface of the headband; and (c) a light apparatus located within the pocket and retained within the pocket in a fixed disposition by frictional engagement with the grommet, the grommet accommodating the passing of the light apparatus therethrough.

2. The headgear of claim 1, wherein the light apparatus is frictionally retained in place by engagement with an inner peripheral surface of the grommet.

3. The headgear of claim 1, wherein the grommet is formed from a rubber material and has a degree of resiliency for tightly receiving a housing of the light apparatus within the opening of the grommet.

* * * * *